(12) United States Patent
Anderl

(10) Patent No.: US 7,929,949 B2
(45) Date of Patent: Apr. 19, 2011

(54) INTERACTIVE MULTIMODAL MESSAGING

(75) Inventor: Ewald Anderl, Middletown, NJ (US)

(73) Assignee: Kirusa Inc., New Providence, NJ (US)

( * ) Notice: Subject to any disclaimer, the term of this patent is extended or adjusted under 35 U.S.C. 154(b) by 28 days.

(21) Appl. No.: 12/365,157

(22) Filed: Feb. 3, 2009

(65) Prior Publication Data
US 2010/0197278 A1    Aug. 5, 2010

(51) Int. Cl.
*H04M 1/725* (2006.01)
(52) U.S. Cl. .......... 455/412.1; 370/352; 379/93.01; 704/243
(58) Field of Classification Search .......... 455/412.1; 379/93.01; 370/352; 345/863; 704/243
See application file for complete search history.

(56) References Cited

U.S. PATENT DOCUMENTS

| | | | |
|---|---|---|---|
| 6,014,427 A | 1/2000 | Hanson et al. | |
| 6,829,334 B1 | 12/2004 | Zirngibl et al. | |
| 6,895,084 B1 | 5/2005 | Saylor et al. | |
| 7,254,384 B2 * | 8/2007 | Gailey et al. | 455/412.1 |
| 7,321,854 B2 * | 1/2008 | Sharma et al. | 704/243 |
| 2003/0032409 A1 | 2/2003 | Hutcheson et al. | |
| 2004/0056907 A1 * | 3/2004 | Sharma et al. | 345/863 |
| 2007/0280205 A1 * | 12/2007 | Howell et al. | 370/352 |
| 2009/0028306 A1 * | 1/2009 | Rhie | 379/93.01 |

FOREIGN PATENT DOCUMENTS

WO    WO9527360 A1    10/1995

* cited by examiner

Primary Examiner — William D Cumming
(74) Attorney, Agent, or Firm — Ash Tankha; IP Legal Services

(57) ABSTRACT

A method and system is provided to enable a recipient to interact with an interactive multimodal message triggered on the recipient's mobile device. A sender creates the interactive multimodal message using a client application. A server stores the created interactive multimodal message. The server sends a notification to the recipient's mobile device. The notification comprises a pointer to the stored interactive multimodal message. The stored interactive multimodal message is triggered on the recipient's mobile device when the pointer in the notification is accessed. Service information is transmitted to the recipient's mobile device through the triggered interactive multimodal message. The interactive multimodal message triggered on the recipient's mobile device enables the recipient interaction. The interactive multimodal message may be forwarded to one or more second recipients simultaneously. At least a part of the forwarded interactive multimodal message is displayed differently to each of the second recipients.

20 Claims, 4 Drawing Sheets

INTERACTIVE MULTIMODAL MESSAGING

CROSS REFERENCE TO RELATED APPLICATIONS

The following patent and patent applications are incorporated herein by reference:
1. Patent application Ser. No. 11/019,754, now U.S. Pat. No. 7,184,786, titled "Techniques For Combining Voice With Text Short Message Services" assigned to Kirusa, Inc., NJ, USA filed on Dec. 21, 2004 at the United States Patent and Trademark Office and granted on Feb. 27, 2007.
2. Patent application Ser. No. 12/008,321, titled "Billing Off-Net Users For Telecom Services" assigned to Kirusa, Inc., NJ, USA, filed on Jan. 9, 2008 at the United States Patent and Trademark Office.

BACKGROUND

This invention, in general, relates to mobile communication. More particularly, this invention relates to enabling a recipient to interact with an interactive multimodal message triggered on a mobile device of the recipient.

Mobile communication service providers typically allow subscribers to make voice calls and to send text messages and multimedia messages over a communication network. Voice calls can only be made if a calling subscriber and a called subscriber are connected to each other via the mobile communication network at the same time. Often, a called subscriber may be busy and unable to answer a call from a calling subscriber. The called subscriber may therefore miss important calls. Text messages have a maximum character limit for every message; therefore the amount of information transmitted as a text message may be limited. Furthermore, the content of text messages is limited to plain text without visual enhancements or interactivity. Multimedia messages allow subscribers to send images, videos, and other kinds of multimedia content over the communication network. However, there is limited interactivity in the multimedia messages. The content of a single multimedia message remains unchanged when forwarded to different recipients.

Mobile communication service providers further provide voicemail services where the calling subscriber may leave a message for the called subscriber if a voice call is not answered by the called subscriber. The voicemail message is stored at a server and may be accessed by the called subscriber at a later point in time. A voicemail service is analogous to an answering machine. The voicemail messages are recorded sound files with limited interactivity. The interactivity offered to the called subscriber while accessing the voicemail message is provided by the server and not the message. The voicemail message itself is static in nature.

Mobile communication service providers also provide services that allow a subscriber to send a text message with a request to purchase chosen ringtones, wallpapers, etc, or to activate a chosen new service, for example to activate or deactivate roaming, to the service provider. However, the choice is typically made by the subscriber offline, while the text message is used only for conveying the choice to the service provider. The text message itself is non interactive.

Hence, there is a need for enabling a recipient to interact with an interactive multimodal message comprising interactive dynamic content triggered on a mobile device.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein address the above stated need for enabling a recipient to interact with an interactive multimodal message comprising interactive dynamic content triggered on a mobile device. A sender creates the interactive multimodal message using a client application. The client application may be available to the sender, for example, on a mobile device of the sender, over a voice call, or via a web interface. The created interactive multimodal message is stored at a server. The server sends a notification to the recipient's mobile device. The notification comprises a pointer to the stored interactive multimodal message. The stored interactive multimodal message is triggered on the mobile device of the recipient when the recipient accesses the pointer in the notification. The recipient may trigger the interactive multimodal message using, for example, one or more of dual-tone multi-frequency dialogs, prompts in voice extensible markup language, automated speech recognition, and a hypertext transfer protocol post. The interactive multimodal message may be triggered when the recipient navigates through voice messages on the mobile device. The interactive multimodal message may also be triggered when the recipient activates a link in a text message on the mobile device.

Service information is transmitted to the mobile device of the recipient through the triggered interactive multimodal message. The transmitted service information may provide the recipient with one or more options, and the recipient may select one of the provided options. Service content may be transmitted based on the selected option from the sender to the mobile device of the recipient. The recipient may be billed for the transmitted service content based on the selected option.

The interactive multimodal messages may be grouped at the server based on predefined grouping rules. The predefined grouping rules may be based on one or more of context of the interactive multimodal message and recipient information. The recipient interacts with the triggered interactive multimodal message. The interactive multimodal message triggered on the mobile device enables recipient interaction.

The recipient may forward the interactive multimodal message to multiple second recipients simultaneously. At least a part of the forwarded interactive multimodal message is displayed differently to each of the second recipients based on services subscribed to by each of the second recipients and second recipient information.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
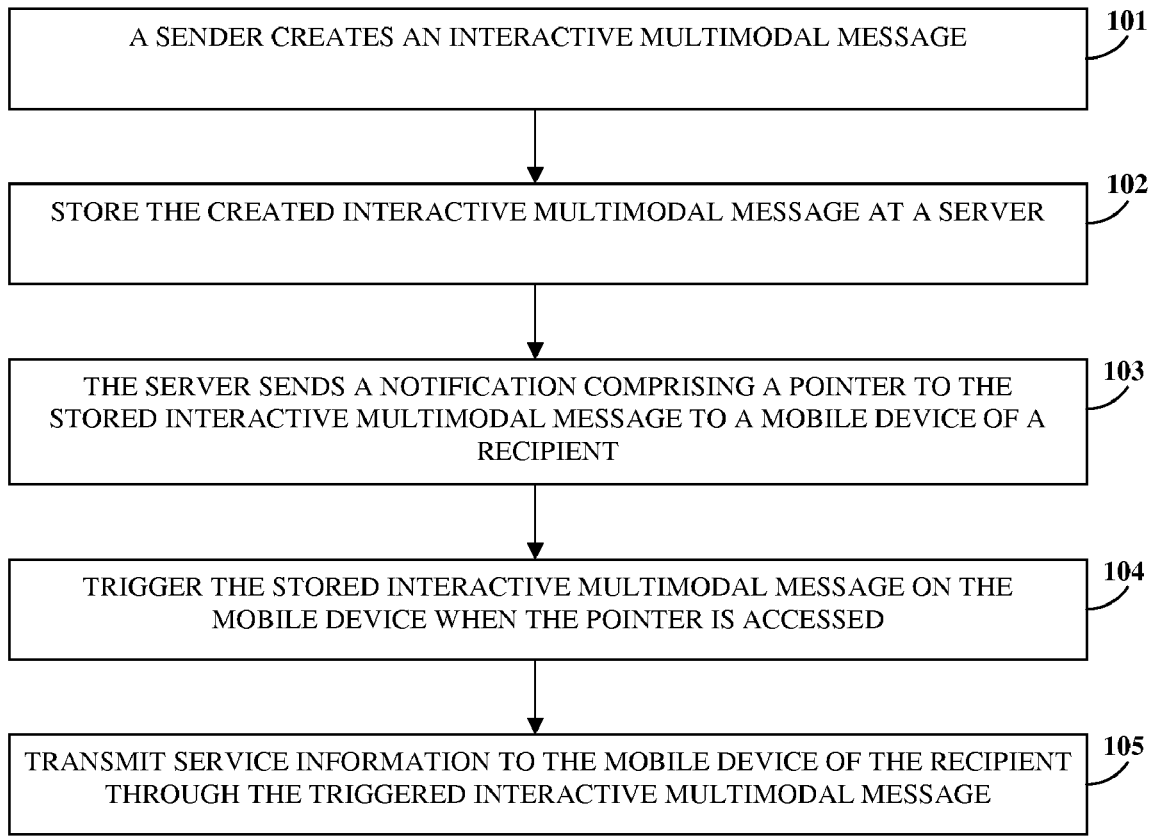
FIG. 1 illustrates a method of enabling a recipient to interact with an interactive multimodal message triggered on a mobile device of the recipient.

FIG. 1 illustrates a method of enabling a recipient 205 to interact with an interactive multimodal message triggered on a mobile device of the recipient 205. As used herein, the term "multimodal message" is a seamless combination of graphics, text, and audio output or a combination of the above modalities with speech, text, and touch input or vice-versa.

The multimodal messages are a combination of voice data and other modalities, for example, image, video, etc., with a text short message service (SMS) message. The multimodal messages enable use of multiple modalities of communication based on requirements of a sender 201 and the usage environment. As used herein, modalities refer to any human mode of interaction on the input side of an application, for example, the sender's 201 voice, any visual mode, or combination of voice and any visual mode, etc., that allows the sender 201 to speak, hear, type, touch or see in that application, and one or more human interaction modes on the output side of the application such as the recipient's 205 ability to hear, visually see, or simultaneously hear and visually see the output. Multimodal interactions thereby extend web or other application user interfaces to allow multiple modes of interaction, offering the sender 201, for example, the choice of using their voice, or an input device such as a key pad, keyboard, mouse, or stylus. For output, the recipient 205 will, for example, be able to listen to spoken prompts and audio, to view information on graphical displays, and to simultaneously listen to and view an output.

Multimodal messaging enable users to send and receive voice messages associated directly with text SMS messages. To send a multimodal message, the sender 201 composes a message to be sent using SMS technology using a text input device, for example, a keypad of a mobile phone. The composed text message is associated and combined with a voice message recorded by the sender 201. The combined message is sent to the recipient 205 via a multimodal messaging platform. The multimodal messaging platform synchronizes and processes input voice and text information and transfers the synchronized and processed information to a mobile phone of the recipient 205. The multimodal messaging platform enables wireless carriers and service providers to offer applications with integrated voice and visual interfaces.

Figure 2:
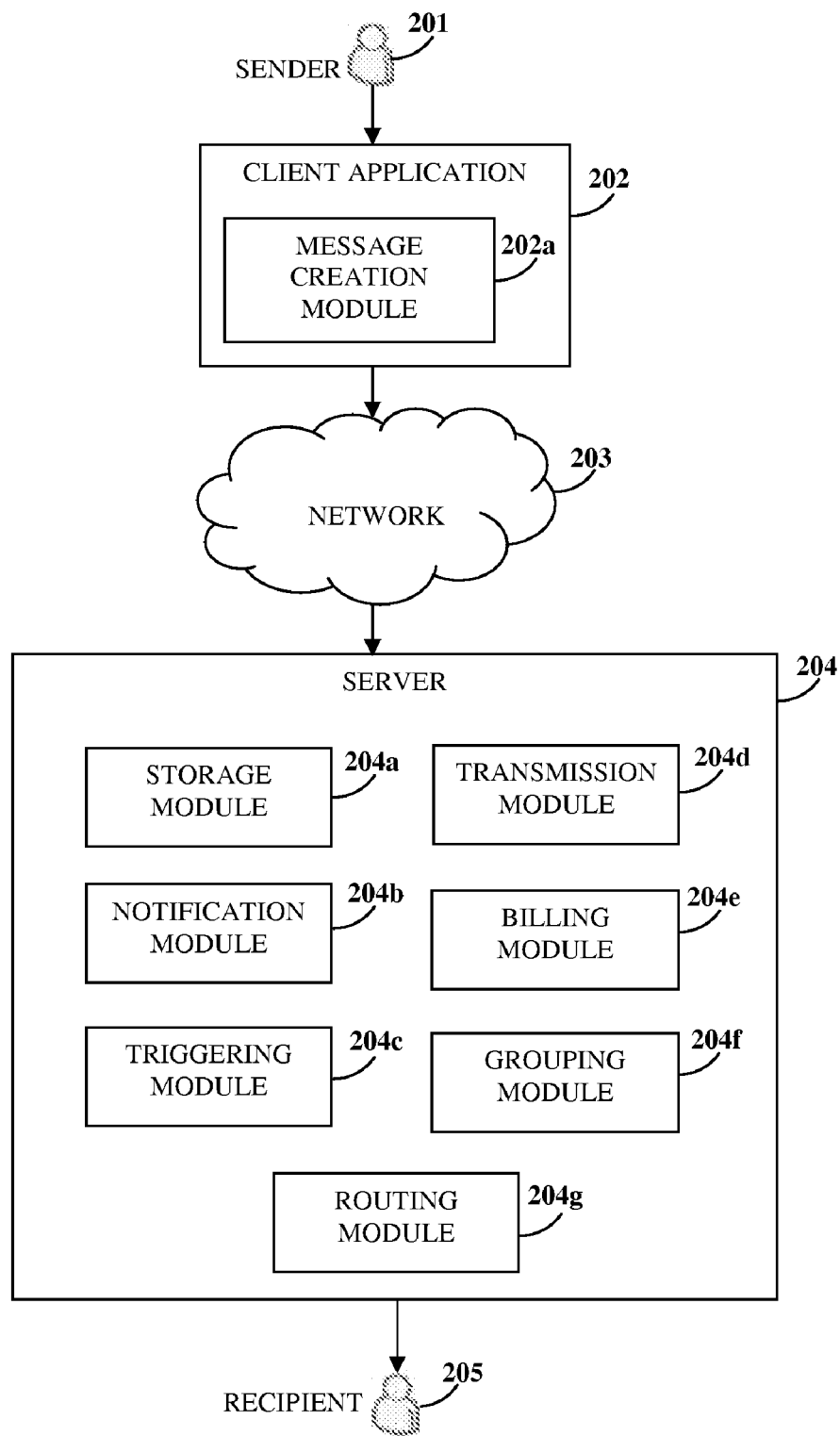
FIG. 2 illustrates a system for enabling a recipient to interact with an interactive multimodal message triggered on a mobile device of the recipient.

In the method disclosed herein, a sender 201 creates 101 the interactive multimodal message using a client application 202 as illustrated in FIG. 2. There may be multiple methods for making the client application 202 available to the sender 201. The client application 202 may, for example, be made available to the sender 201 on a mobile device of the sender 201. The client application 202 may be provided as a functionality in a compose function available in a voice short message service (voice SMS) application provided over a voice connection, as disclosed and claimed in patent application Ser. No. 11/019,754, now U.S. Pat. No. 7,184,786, titled "Techniques For Combining Voice With Wireless Text Short Message Services". Voice SMS allows users to send and receive voice messages associated with text SMS messages. In U.S. Pat. No. 7,184,786, a user of a standard SMS text service is provided with a link within each message that allows addition or retrieval of a voice message associated with an SMS text message. A voice SMS platform may be associated with a media platform for recording or playing back voice recordings, recognition of voice commands, and rendering of text into speech.

The client application 202 may also be made available over a voice call or via a web interface that allows the sender 201 to create an interactive multimodal message. The interactive multimodal message may, for example, comprise text, images, video, voice content, and any combination thereof, as well as web based scripted interfaces. The created interactive multimodal message is stored 102 at a server 204. The server 204 may, for example, be a remote server. The server 204 sends 103 a notification to the recipient's 205 mobile device. The notification may, for example, be an unstructured supplementary service data (USSD) prompt, a text message, a voice SMS message, or a voice call. The notification comprises a pointer to the stored interactive multimodal message. The pointer may, for example, be a text link to the stored interactive multimodal message, a USSD code, etc. The recipient 205 and the sender 201 may be subscribers of a single mobile communication network or of different mobile communication networks.

When the recipient 205 accesses the pointer in the notification through the recipient's 205 mobile device, the stored interactive multimodal message is triggered 104 on the recipient's 205 mobile device. The interactive multimodal message may, for example, be triggered when the recipient 205 navigates through voice messages on the recipient's 205 mobile device. The interactive multimodal message may also be triggered when the recipient 205 activates a link in a text message on the recipient's 205 mobile device. Furthermore, the recipient 205 may trigger the interactive multimodal message using, for example, one or more of dual-tone multi-frequency dialogs, prompts in voice extensible markup language, automated speech recognition, and a hypertext transfer protocol post.

Service information is transmitted 105 to the mobile device of the recipient 205 through the triggered interactive multimodal message. The transmitted service information may, for example, comprise advertisements, alerts, or service content previews provided by the sender 201. The transmitted service information may provide the recipient 205 with one or more options, and the recipient 205 may select one of the provided options. The selection of options by the recipient 205 may be implemented to run on a VoiceXML (VXML) server, with a script written by an application owner. Service content may be transmitted to the recipient's 205 mobile device from the sender 201 based on the selected option. The transmitted service content may, for example, be an hourly weather update or a daily horoscope reading. The transmission of the service content may require the recipient 205 to subscribe to the service of the sender 201.

The recipient 205 may be billed for the transmitted service content based on the selected option. The mode of billing may depend on the option selected by the recipient 205. For example, the service information transmitted from a sender 201 providing horoscope services may provide the recipient 205 with the following three options: "view horoscope summary", "view detailed horoscope", and "view advertisements". If the recipient 205 selects the "view horoscope summary" option, the mode of billing may be zero billing, and the recipient 205 may not be billed for the transmitted service content. If the recipient 205 selects the "view detailed horoscope" option, the mode of billing may be premium billing, and the recipient 205 may be billed for a higher amount. If the recipient 205 selects the "view advertisements" option, the mode of billing may be negative billing, and the recipient 205 may be given a reward, for example, an amount may be deducted from a bill payable by the recipient 205. If the recipient 205 is not a subscriber of the same mobile communication network as the sender 201, the mode of billing may be off-net billing, as disclosed and claimed in patent application Ser. No. 12/008,321, titled "Billing Off-Net Users For Telecom Services".

In the off-net billing mode, a sender 201 subscribing to a first network, hereafter referred to as an on-net user, may send a first voice SMS message to a recipient 205 subscribing to a second network, hereafter referred to as an off-net user. The off-net user may reply to the first voice SMS message with a second voice SMS message. The second voice SMS message reply is routed to an intelligent network element of the first network. The intelligent network element prompts the off-net user for a payment for delivering the second voice SMS message reply to the sender 201. The intelligent network element prompts the off-net user by sending a text SMS message prompt to the off-net user, asking the off-net user to pay a stated fee for replying to or forwarding the voice SMS message. If the off-net user sends a reply SMS message to the text SMS message prompt, the off-net user is charged a stated fee by the second network for sending the SMS message. Such an SMS message sent by the off-net user in reply to the text SMS message prompt is referred to as a premium SMS as the premium SMS incurs a charge higher than a usual SMS sent by the off-net user.

The operator of the second network collects revenue for the premium SMS from the off-net user, and shares a part of the revenue with the operator of the first network. A value added services (VAS) gateway may be used for delivering and billing a recipient 205 who is not subscribed to the same mobile communication network as the sender 201.

The recipient 205 interacts with the triggered interactive multimodal message. The interaction with the interactive multimodal message by the recipient 205 may, for example, comprise ending the interactive multimodal message, replying to the interactive multimodal message, or forwarding the interactive multimodal message to one or more second recipients. The interactive multimodal messages may be grouped based on predefined grouping rules. The predefined grouping rules may be based on factors such as the context of the interactive multimodal message, prior responses to earlier interactive multimodal messages, for example, those recipients who had accepted an offer vs. those recipients that had declined, etc. Moreover, since mobile phone messages are personal, the interactive multimodal messages may be grouped based on other information known about the recipient 205, for example, language, date of birth, demographics, etc.

The interactive multimodal message may be forwarded to multiple second recipients simultaneously. The service content transmitted from a sender 201 providing services may be dynamic. At least a part of the interactive multimodal message is modified when the recipient 205 forwards the interactive multimodal message to the second recipients. Any item that can be linked to or inferred about the recipients based on the recipient information, for example, addresses of the recipients, can be used to modify the interactive multimodal message. The forwarded interactive multimodal message is displayed differently to each of the second recipients based on services subscribed to by each of the second recipients and second recipient information, for example, date of birth, language, etc. For example, if a recipient 205 receives an interactive multimodal message from a sender 201 providing services to which the recipient 205 has not subscribed to, the interactive multimodal message may only display a preview of the service content and provide the recipient 205 with an option to subscribe to the services provided by the sender 201. However, the same interactive multimodal message may display the entire transmitted service content to the recipient 205 if the recipient 205 has subscribed to the services provided by the sender 201. In another example, a sender 201 providing horoscope services may dynamically play the appropriate content based on the date of birth of the recipient 205. Another example is a follow up to a survey. The recipients who responded to an offer are provided with a "thank you" message and a discount offer whereas the recipients who did not respond to the offer are provided with a shortened survey one last time with the promise of some reward.

The interaction with the interactive multimodal message by the recipient 205 may exemplarily comprise selecting and purchasing a ring tone out of a set of offered ring tones through the interactive multimodal message, sending a text reply through the interactive multimodal message, participating in a user survey conducted by the sender 201 through the interactive multimodal message, etc. The interactive multimodal message triggered on the mobile device therefore enables recipient interaction.

FIG. 2 illustrates a system for enabling a recipient 205 to interact with an interactive multimodal message triggered on a mobile device of a recipient 205. The system disclosed herein comprises a client application 202 and a server 204 connected via a network 203. The client application 202 comprises a message creating module 202a. The server 204 comprises a storage module 204a, a notification module 204b, a triggering module 204c, a transmission module 204d, a billing module 204e, a grouping module 204f, and a routing module 204g.

The message creation module 202a in the client application 202 creates the interactive multimodal message. The storage module 204a stores the created interactive multimodal message at the server 204. The notification module 204b sends a notification comprising a pointer to the stored interactive multimodal message to the mobile device of the recipient 205. The triggering module 204c triggers the stored interactive multimodal message on the mobile device of the recipient 205 when the pointer in the notification is accessed by the recipient 205. The triggering module 204c may trigger the interactive multimodal message when the recipient 205 navigates through voice messages on the mobile device of the recipient 205. The triggering module 204c may also trigger the interactive multimodal message when the recipient 205 activates a link in a text message on the mobile device of the recipient 205.

The transmission module 204d transmits service information to the mobile device of the recipient 205 through the triggered interactive multimodal message. The transmission module 204d also transmits service content from the sender 201 to the mobile device of the recipient 205 based on an option selected by the recipient 205. The option is selected from multiple options provided by the transmitted service content. The billing module 204e bills the recipient 205 for the transmitted service content, based on the selected option. The billing module 204e may select a mode of billing depending on the option selected by the recipient 205. For example, the billing module 204e may select from standard billing mode, premium billing mode, zero billing mode, off-net billing mode, etc., depending on the option selected by the recipient 205.

The grouping module 204f groups the interactive multimodal messages at the server 204 based on predefined grouping rules. The predefined grouping rules may, for example, be based on factors such as the context of the interactive multimodal message, recipient information, etc. The routing module 204g enables sending of the interactive multimodal message, forwarding of the interactive multimodal message to a second recipient, forwarding of the interactive multimodal message to multiple second recipients, and replying to the interactive multimodal message. The server 204 displays at least a part of the forwarded interactive multimodal message differently to each of the second recipients based on services subscribed to by each of the second recipients and the second recipient information.

Figure 3:
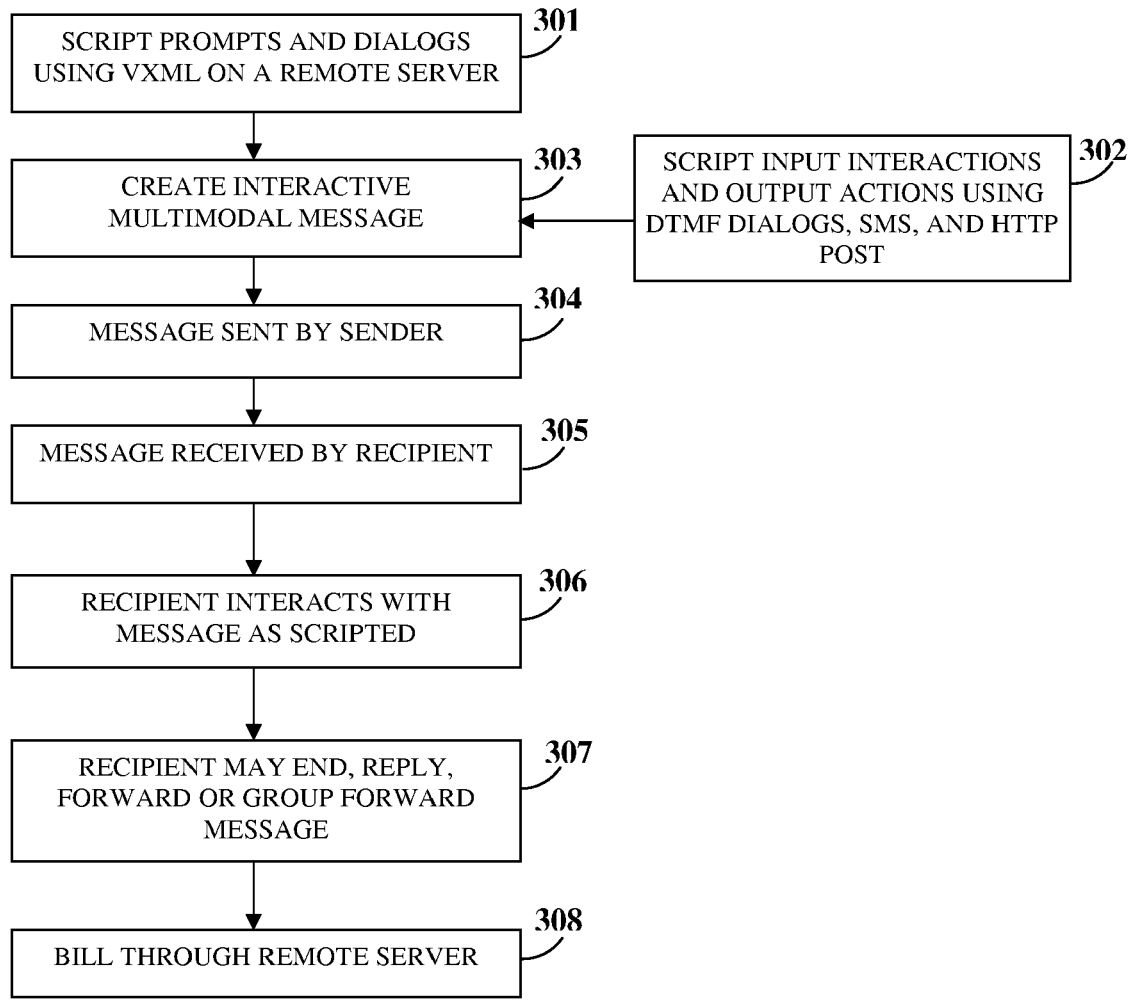
FIG. 3 exemplarily illustrates a flowchart for a process of enabling a recipient to interact with an interactive multimodal message triggered on a mobile device of the recipient.

FIG. 3 exemplarily illustrates a flowchart for a process of enabling a recipient 205 to interact with an interactive multimodal message triggered on the recipient's 205 mobile device. Prompts and dialogs are scripted 301 using VXML on the server 204. Input interactions and output actions are scripted 302 using dual tone multi frequency (DTMF) dialogs, short message service (SMS), and hypertext transfer protocol (HTTP) post requests. The scripted prompts and dialogs and the scripted input interactions and output actions are used to create 303 an interactive multimodal message by a sender 201. The interactive multimodal message is sent 304 by the sender 201. The interactive multimodal message is received 305 by the recipient 205. The recipient 205 interacts 306 with the interactive multimodal message as scripted. The recipient 205 may end, reply, forward, or group forward 307 the interactive multimodal message. The recipient 205 is billed 308 through the server 204 based on the recipient's 205 interaction with the interactive multimodal message.

Figure 4:
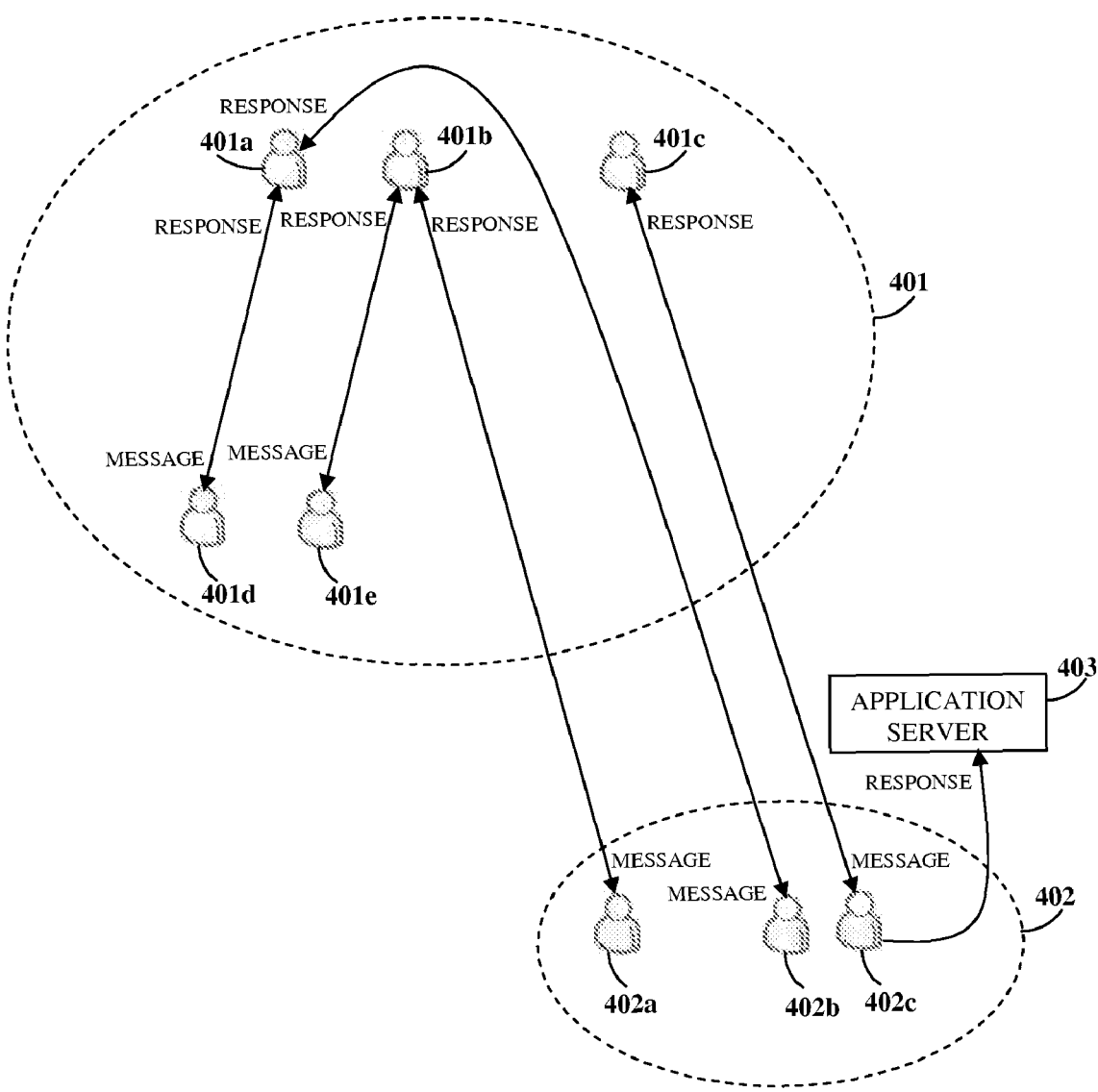
FIG. 4 exemplarily illustrates exchange of interactive multimodal messages and responses thereto between multiple senders and multiple recipients over different mobile communication networks.

FIG. 4 exemplarily illustrates exchange of interactive multimodal messages and responses thereto between multiple senders 401a, 401b, and 401c and multiple recipients 401d, 401e, 402a, 402b, and 402c over different mobile communication networks. A first sender 401a, a second sender 401b, and a third sender 401c are subscribers of the first mobile communication network 401. The first sender 401a, the second sender 401b, and the third sender 401c send interactive multimodal messages through the system disclosed herein illustrated in FIG. 2, to multiple recipients 401d, 401e, 402a, 402b, and 402c. The recipients 401d and 401e may be subscribers of the first mobile communication network 401 and the recipients 402a, 402b, and 402c may be subscribers of the second mobile communication network 402 as illustrated in FIG. 4. The first sender 401a and the second sender 401b send interactive multimodal messages to a first recipient 401d and a second recipient 401e respectively through the system. The first recipient 401d and the second recipient 401e are both subscribers of the first mobile communication network 401.

The first recipient 401d and the second recipient 401e interact with the interactive multimodal messages and send responses to the first sender 401a and the second sender 401b respectively through the system. A single interactive multimodal message may be displayed differently to the first recipient 401d and the second recipient 401e. The first recipient 401d may be subscribed to a weather update service which allows the first recipient 401d to view an interactive multimodal message from the weather update service in its entirety. However, the second recipient 401e may not be subscribed to the weather update service; therefore the same message displayed in entirety to the first recipient 401d may only be displayed in brief to the second recipient 401e, with an additional option for the second recipient 401e to subscribe to the weather update service. The first recipient 401d and the second recipient 401e are billed for service content transmitted through the interactive multimodal messages based on billing rules applicable within the first mobile communication network 401. The billing rules may comprise multiple billing modes, for example, zero billing, negative billing, and premium billing.

The first sender 401a, the second sender 401b, and the third sender 401c also send interactive multimodal messages to a third recipient 402b, a fourth recipient 402a, and a fifth recipient 402c respectively. The third recipient 402b, the fourth recipient 402a, and the fifth recipient 402c are subscribers of the second mobile communication network 402. Display of interactive multimodal messages to the third recipient 402b, the fourth recipient 402a, and the fifth recipient 402c may be different from the display of the interactive multimodal messages to the first recipient 401d and the second recipient 401e. The interactive multimodal messages may offer the third recipient 402b, the fourth recipient 402a, and the fifth recipient 402c limited options or additional options, based on the content of the interactive multimodal messages. The third recipient 402b, the fourth recipient 402a, and the fifth recipient 402c interact with the interactive multimodal message and send responses to the first sender 401a, the second sender 401b, and the third sender 401c respectively. In addition, responses may also be sent by a recipient 402a, 402b, or 402c to an application server 403. In FIG. 4, the fifth recipient 402c sends a response to the application server 403 for further processing.

The third recipient 402b, the fourth recipient 402a, and the fifth recipient 402c are billed for service content transmitted through the interactive multimodal messages based on predefined billing rules. Since the third recipient 402b, the fourth recipient 402a, and the fifth recipient 402c are subscribers of a mobile communication network different from the first sender 401a, the second sender 401b, and the third sender 401c, the billing mode in this example is off-net billing. The billing is also done based on options selected by the third recipient 402b, the fourth recipient 402a, and the fifth recipient 402c during interaction with the interactive multimodal messages.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of enabling a recipient to interact with an interactive multimodal message triggered on a mobile device of said recipient, comprising the steps of:
   creating said interactive multimodal message by a sender using a client application available to said sender, wherein said created interactive multimodal message is stored at a server;
   sending a notification comprising a pointer to said stored interactive multimodal message to said mobile device of the recipient by said server;
   triggering the stored interactive multimodal message on the mobile device of the recipient by accessing said pointer in said notification; and
   transmitting service information to the mobile device of the recipient through said triggered interactive multimodal message;
   whereby the interactive multimodal message triggered on the mobile device enables said recipient interaction.

2. The method of claim 1, wherein the recipient triggers the interactive multimodal message using on or more of dual-tone multi frequency dialogs, prompts in voice extensible markup language, automated speech recognition, and a hypertext transfer protocol post.

3. The method of claim 1, wherein the interactive multimodal message is triggered on navigating through voice messages on the mobile device by the recipient.

4. The method of claim 1, wherein the interactive multimodal message is triggered on activating a link in a text message on the mobile device by the recipient.

5. The method of claim 1, wherein said transmitted service information provides the recipient with one or more options, wherein the recipient selects one of said provided options.

6. The method of claim 5, further comprising the step of transmitting service content from the sender to the mobile device of the recipient based on said selected option.

7. The method of claim 6, further comprising the step of billing the recipient for said transmitted service content based on the selected option.

8. The method of claim 1, wherein each interactive multimodal message is grouped at the server based on predefined grouping rules, wherein said predefined grouping rules are based on one one or more of context of the interactive multimodal message and recipient information.

9. The method of claim 1, further comprising the step of forwarding the interactive multimodal message to a plurality of second recipients simultaneously.

10. The method of claim 9, wherein at least a part of said forwarded interactive multimodal message is displayed differently to each of said second recipients based on services subscribed to by each of the second recipients and second recipient information.

11. A system for enabling a recipient to interact with an interactive multimodal message triggered on a mobile device of said recipient, comprising:
   a client application comprising a message creation module for creating said interactive multimodal message by a sender;
   a server comprising:
      a storage module for storing said created interactive multimodal message;
      a notification module for sending a notification comprising a pointer to said stored interactive multimodal message to said mobile device of the recipient;
      a triggering module for triggering the stored interactive multimodal message on the mobile device of the recipient; and
      a transmission module for transmitting service information to the mobile device of the recipient through said triggered interactive multimodal message.

12. The system of claim 11, wherein said server further comprises a grouping module for grouping each interactive multimodal message based on predefined grouping rules, wherein said predefined grouping rules are based on one or more of context of the interactive multimodal messages and recipient information.

13. A The system of claim 11, wherein said server further comprises a routing module for enabling sending of the interactive multimodal message, forwarding of the interactive multimodal message to a second recipient, forwarding of the interactive multimodal message to a plurality of second recipients simultaneously, and replying to the interactive multimodal message.

14. The system of claim 13, wherein the server displays at least a part of said forwarded interactive multimodal message differently to each of said second recipients based on services subscribed to by each of the second recipients and second recipient information.

15. The system of claim 11, wherein said transmission module transmits service content from said sender to the mobile device of the recipient based on an option selected by the recipient, wherein said option is selected from a plurality of options provided by said transmitted service information.

16. The system of claim 15, wherein the server further comprises a billing module for billing the recipient for said transmitted service content based on said selected option.

17. The system of claim 11, wherein said triggering module triggers the interactive multimodal message when the recipient accesses said pointer in said notification.

18. The system of claim 11, wherein said triggering module triggers the interactive multimodal message on navigating through voice messages on the mobile device by the recipient.

19. The system of claim 11, wherein the triggering module triggers the interactive multimodal message on activating a link in a text message on the mobile device by the recipient.

20. A computer program product comprising computer executable instructions embodied in a non-transitory computer-readable medium, wherein said computer program product comprises a plurality of computer parsable codes for causing a computer to:

create an interactive multimodal message;

store said created interactive multimodal message at a server;

send a notification comprising a pointer to said stored interactive multimodal message to a mobile device of a recipient;

send the stored interactive multimodal message on said mobile device of said recipient;

transmit service information to the mobile device of the recipient through said triggered interactive multimodal message;

group each interactive multimodal message at said server; and bill the recipient for service content transmitted from the sender.

* * * * *